US012747973B2

(12) United States Patent
Derevyagin et al.

(10) Patent No.: US 12,747,973 B2
(45) Date of Patent: Sep. 29, 2026

(54) DEVICE AND METHOD FOR ULTRASONIC MEASUREMENT OF THE FLUID FLOW VELOCITY AND FLOWRATE

(71) Applicants: Alexandr Mikhailovich Derevyagin, Moscow (RU); Gleb Alexandrovich Derevyagin, Moscow (RU)

(72) Inventors: Alexandr Mikhailovich Derevyagin, Moscow (RU); Gleb Alexandrovich Derevyagin, Moscow (RU)

(73) Assignees: Alexandr Mikhailovich Derevyagin, Moscow (RU); Gleb Alexandrovich Derevyagin, Moscow (RU)

( * ) Notice: Subject to any disclaimer, the term of this patent is extended or adjusted under 35 U.S.C. 154(b) by 291 days.

(21) Appl. No.: 18/683,038

(22) PCT Filed: Sep. 15, 2022

(86) PCT No.: PCT/RU2022/050292
§ 371 (c)(1),
(2) Date: Feb. 12, 2024

(87) PCT Pub. No.: WO2023/048599
PCT Pub. Date: Mar. 30, 2023

(65) Prior Publication Data

US 2024/0377234 A1 Nov. 14, 2024

(30) Foreign Application Priority Data

Sep. 23, 2021 (RU) ........................... RU2021127974

(51) Int. Cl.
*G01F 1/66* (2022.01)
*G01F 1/667* (2022.01)

(52) U.S. Cl.
CPC ............. *G01F 1/662* (2013.01); *G01F 1/667* (2013.01)

(58) Field of Classification Search
CPC ...... G01F 1/662; G01F 1/667; G01F 23/2962; G01F 23/296; G01F 23/2961;
(Continued)

(56) References Cited

U.S. PATENT DOCUMENTS 3,869,915 A * 3/1975 Baumoel .................. G01F 1/66 73/861.28
4,365,518 A 12/1982 Zacharias, Jr.
(Continued)

FOREIGN PATENT DOCUMENTS

EP 3063508 B1 4/2018
JP 2004157101 A * 6/2004
(Continued)

OTHER PUBLICATIONS

Jan. 30, 2023—(WO) International Search Report and Written Opinion—App PCT/RU2022/050292.

*Primary Examiner* — John E Breene
*Assistant Examiner* — Truong D Phan
(74) *Attorney, Agent, or Firm* — Banner & Witcoff, Ltd.

(57) ABSTRACT

Device for measuring the flow velocity and flowrate of fluid passing in the flow main direction containing the casing, the means for separating the fluid flow into the plurality of flows, each of the plurality of flows being passed in the channel allocated for it located in the casing, pair of ultrasonic transducers in the casing intended for forming and receiving the ultrasonic waves crossing the channels and generating the electric signals, the means for directing the ultrasonic waves along the acoustic path crossing the channels; means for calculating the fluid flow velocity and flowrate using generated electric signals, is offered. The method in which the abovementioned device for measuring the fluid flow velocity and flowrate is used is also offered.

21 Claims, 5 Drawing Sheets

Figure 1A:
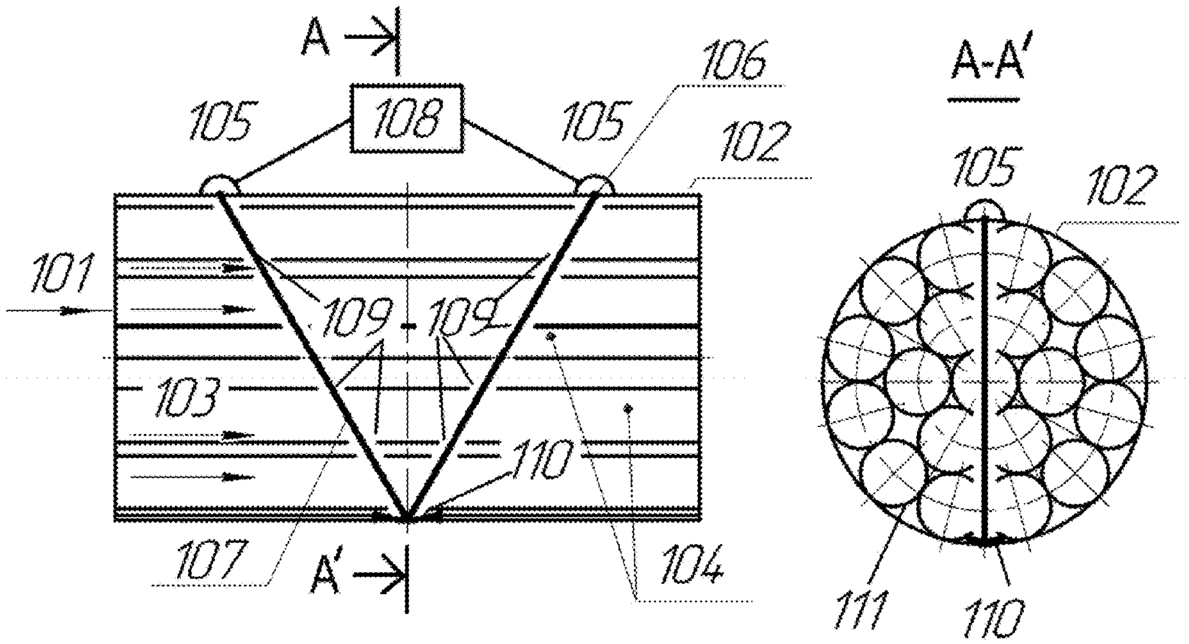

(58) Field of Classification Search
CPC ...... G01F 23/2968; G01F 15/08; G01F 11/00; G01F 1/40; G01F 1/42; G01F 1/8409; G01F 11/006; G01F 15/00; G01F 1/668; G01F 15/02; G01N 2001/244; A61M 1/3663
USPC .............. 73/861.18, 170.07, 170.11, 170.13, 73/861.25, 861.26, 861.27, 861.28, 73/861.31
See application file for complete search history.

(56) References Cited

U.S. PATENT DOCUMENTS

| | | | | |
|---|---|---|---|---|
| 2009/0151471 A1* | 6/2009 | Derevyagin | ............ | G01F 1/662 73/861.27 |
| 2011/0238333 A1 | 9/2011 | Miyata et al. | | |
| 2014/0230568 A1* | 8/2014 | Adachi | ................... | G01F 1/667 73/861.28 |

FOREIGN PATENT DOCUMENTS

| | | | |
|---|---|---|---|
| JP | 4186645 | B2 * | 11/2008 |
| RU | 2422777 | C1 | 6/2011 |
| RU | 2735416 | C1 | 11/2020 |
| RU | 2019139464 | A | 6/2021 |

* cited by examiner

DEVICE AND METHOD FOR ULTRASONIC MEASUREMENT OF THE FLUID FLOW VELOCITY AND FLOWRATE

CROSS-REFERENCE TO RELATED APPLICATIONS

This application is a U.S. National Stage application under 35 U.S.C. § 371 of International Application PCT/RU2022/050292 (published as WO 2023/048599 A1), filed Sep. 15, 2022, which claims the benefit of priority to Application RU 2021127974, filed Sep. 23, 2021. Benefit of the filing date of these prior applications is hereby claimed. Each of these prior applications is hereby incorporated by reference in its entirety.

TECHNICAL FIELD

Invention relates to the field of the ultrasonic measurement of flow parameters of the fluid flowing in the pipeline. In particular, the invention can be used for measuring the flow velocity of fluids, such as oil, gas, water or their combinations.

BACKGROUND OF THE INVENTION

Devices for measuring the velocity of fluids are known in the prior art.

The shortcomings caused by presence of the turbulent flow in the measurement zone are inherent in solutions known in the prior art, therefore the measurement accuracy decreases.

For reducing the influence of flow turbulence in the measurement zone it is recommended to mount the flowmeter on rectilinear portions without change of section throughout 5 . . . 10 diameters of the pipe before and after the flowmeter. However presence of such large rectilinear portions requires considerable material costs and assignment of the extra space for arrangement of such rectilinear portions. Moreover, the accuracy of rectilinearity maintenance in all of this portion also shall be observed. In pipelines of small diameters the rectilinearity in most cases is ensured automatically. But with increasing the pipeline diameter, it becomes more difficult to observe and check necessary rectilinearity. Also the measurement accuracy of the flowmeter is influenced by the low-frequency periodic oscillations related to oscillations of hydrostatic head, for example, by oscillations, caused by presence of flow vortex motions when passing curvilinear portions.

Also for reducing the influence of flow turbulence in the measurement zone, the smoothing of pulsations of the fluid flow velocity caused by periodic curls stalling from different bluff elements of the flowmeter casing (for example, the pipeline input in casing, the pipeline output, change of diameters in the pipeline, presence of roughnesses during production of the casing), and by cross-flows, in flowmeters presence of means flattening the input flow, installed before measuring means i.e. prior to the measurement zone is provided.

In the prior art the solution RU 2019139464 in which the presence of means flattening the input flow, installed before measuring means such as honeycomb or turbulence screen is provided is known. These means will allow to improve the velocity field and to reduce flow washes and turbulence degrees.

Also the embodiment in which in the input chamber the means flattening the input flow, such as honeycomb 2 in the form of the grid with cells of the square or hexagonal shape installed prior to the measurement zone along the casing axis is provided is presented in the solution RU 2735416. This means will allow to improve the velocity field and to reduce flow washes and turbulence degrees.

However, it should be noted that installation of such means flattening the input flow prior to the measurement zone will not allow to exclude influences of bluff elements in the flowmeter casing (for example, pipe crossing inside the casing, flowmeter casing crossing to the pipeline, change of diameters in the flowmeter casing, presence of technological openings in the flowmeter casing, presence of roughnesses during production of the casing) on results of measurement in view of the fact that it is impossible to predict behavior of the fluid in the flowmeter casing after the flattening means.

For the purpose of overcoming abovementioned disadvantages, the device for measuring the flow velocity and flowrate of fluid passing in the flow main direction containing the casing, means for separating the fluid flow into the plurality of flows, each of the plurality of flows being passed in the channel allocated for it located in the casing, at least one pair of ultrasonic transducers installed in the casing and intended for forming and receiving the ultrasonic waves crossing the channels and for generating the electric signals in response to receiving the ultrasonic waves; the means for directing the ultrasonic waves along the acoustic path crossing at least the part of channels; means for calculating the fluid flow velocity and flowrate using generated electric signals, is proposed.

The method of measuring the flow velocity and flowrate of the fluid flowing in the flow main direction wherein the fluid is passed via the device and the measurement reading of the fluid flow velocity and the fluid flowrate is output, is also proposed.

The claimed solution allows to exclude influence of bluff elements in the flowmeter casing on results of measurement in view of the fact that the fluid in the measurement zone in the flowmeter casing will consist of plurality of flows, each of which will pass in the channel of smaller diameter, than the main pipeline, allocated for it and rectilinearity of such channels can be ensured during production of the flowmeter.

Moreover, the proposed solution will allow to refuse usage of long rectilinear portions, and, respectively, will lower the material costs and will reduce necessary space for arrangement of rectilinear portions.

SUMMARY OF THE INVENTION

According to the description, the device for measuring the flow velocity and flowrate of fluid passing in the flow main direction containing casing, means for separating the fluid flow into the plurality of flows, each of the plurality of flows being passed in the channel allocated for it and located in the casing, at least one pair of ultrasonic transducers installed in the casing and intended for forming and receiving ultrasonic waves crossing the channels and for generating the electric signals in response to receiving the ultrasonic waves; means for directing the ultrasonic waves along the acoustic path crossing at least the part of channels; means for calculating the fluid flow velocity and flowrate using generated electric signals, is offered. The method in which the abovementioned device for measuring the fluid flow velocity and flowrate is used, is also proposed.

SHORT DESCRIPTION OF FIGURES

In FIGS. 1A-1G, the embodiment in which separation of the main of the fluid flow is carried out by use of plurality of the pipes installed parallel to the flow main direction and fixed inside the casing of the device for measuring the fluid flow velocity and flowrate is provided.

Figure 2:
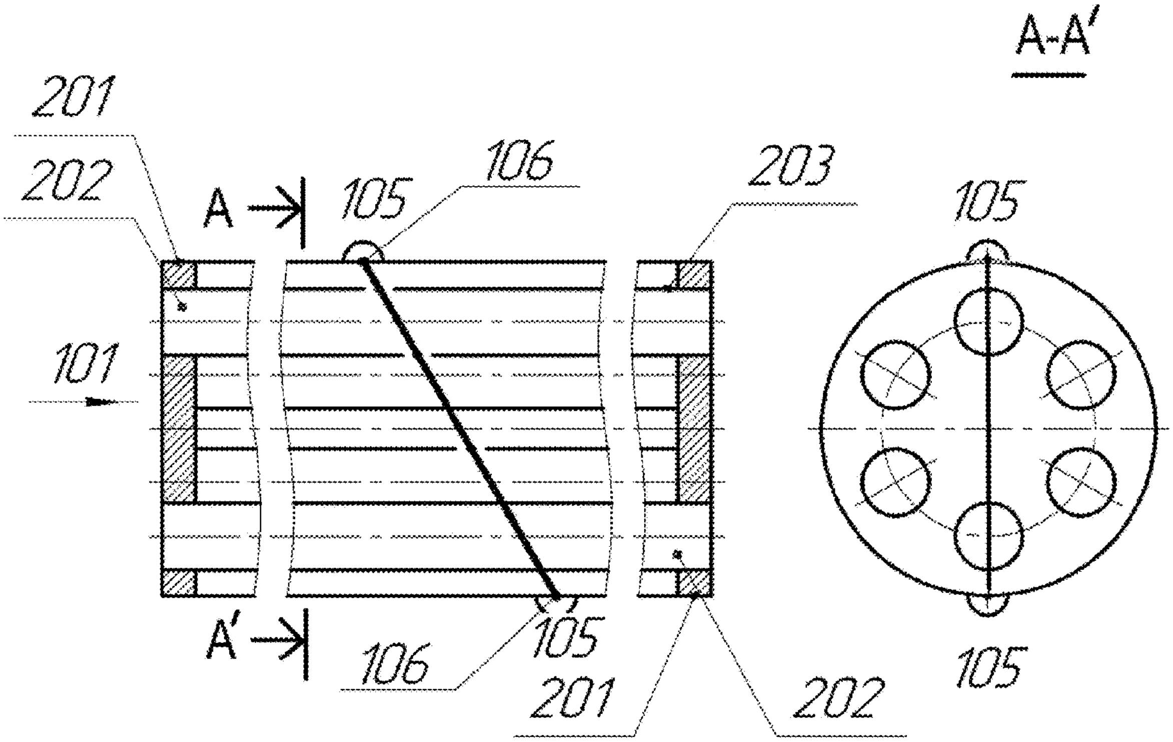

In FIG. 2, the embodiment in which separation of the main of the fluid flow in the casing is carried out by use of pair of plates perpendicular to the main flow with openings, each of which exits in tube connecting openings in plates is provided.

Figure 3A:
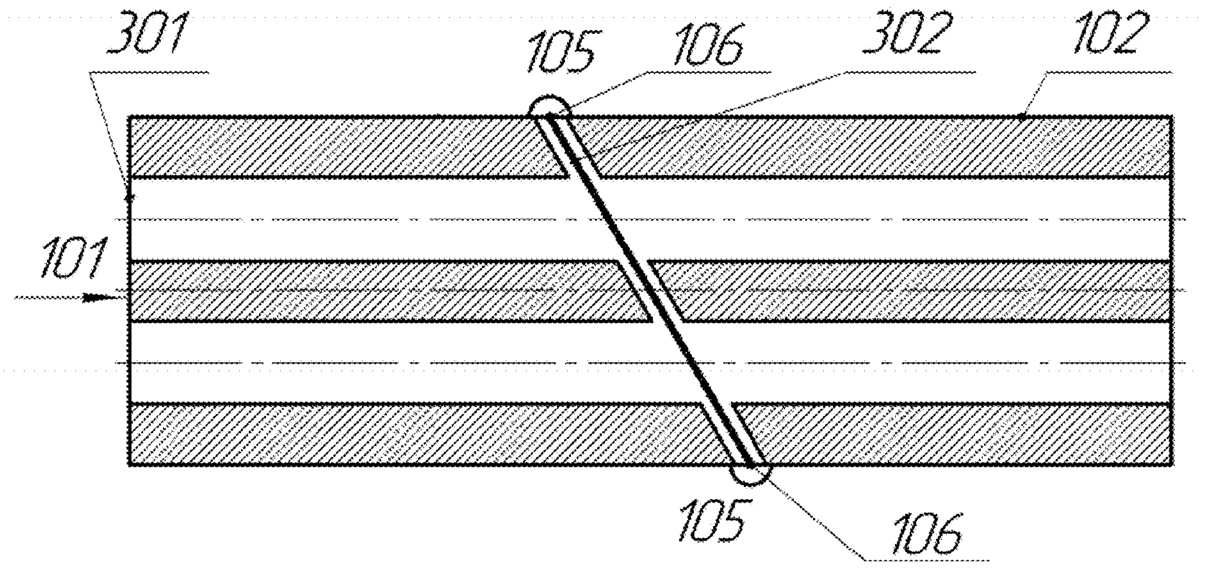
Figure 3B:
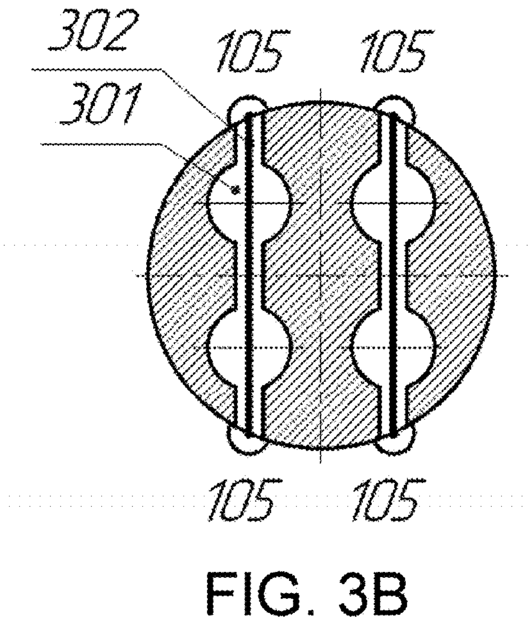
Figure 3C:
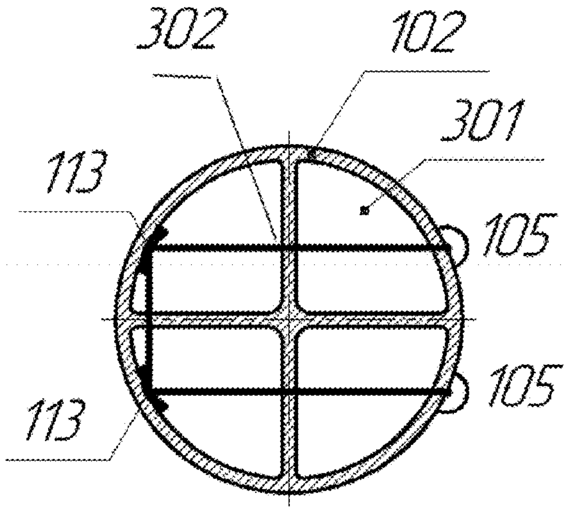

In FIGS. 3A-3C, the embodiment in which separation of the main of the fluid flow is carried out by use of the through openings made parallel to the flow main direction in the solid casing of the device for measuring the fluid flow velocity and flowrate is provided.

Figure 4A:
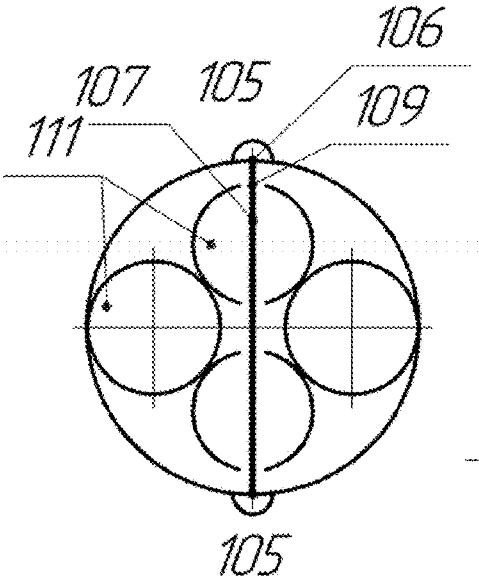
Figure 4B:
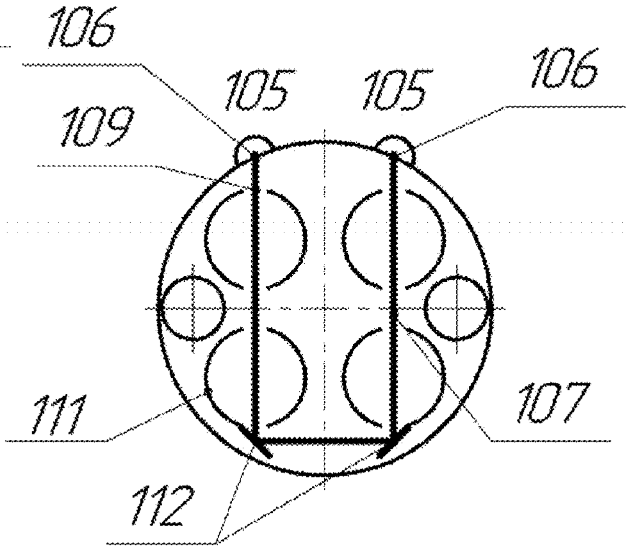
Figure 4C:
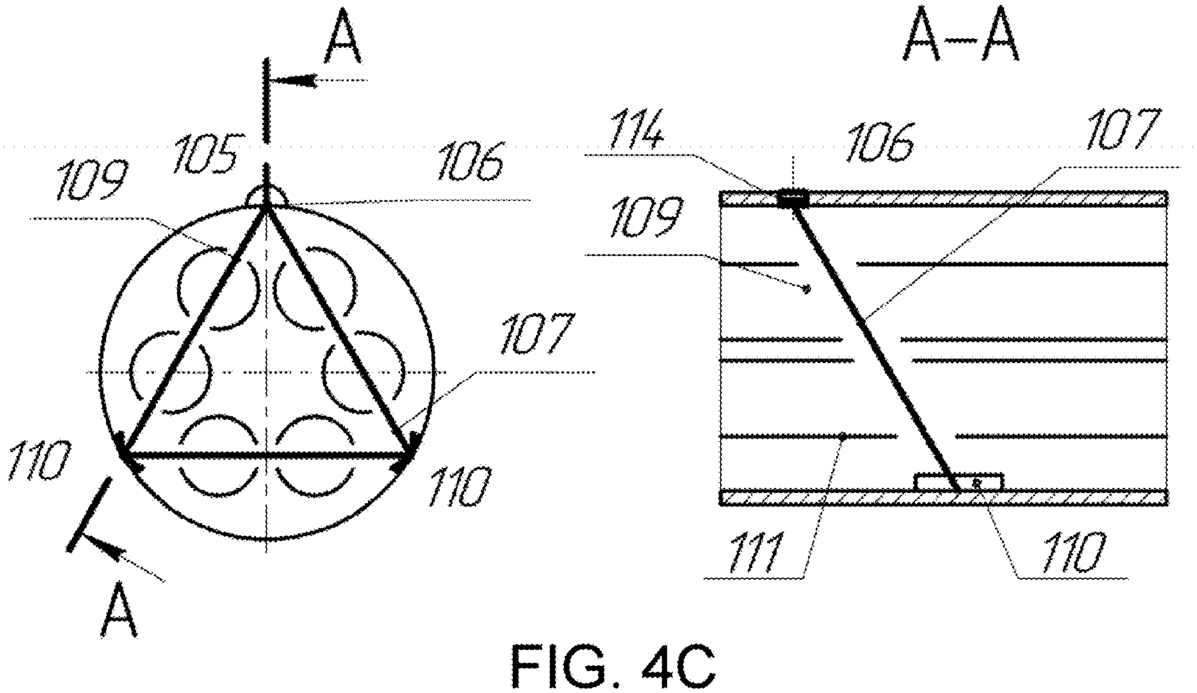

In FIGS. 4A-4C, the embodiment in which, for directing the ultrasonic waves along the acoustic path, pair of openings in the casing, plurality of openings in the plurality of channels and plurality of reflecting surfaces are used is provided.

Figure 5A:
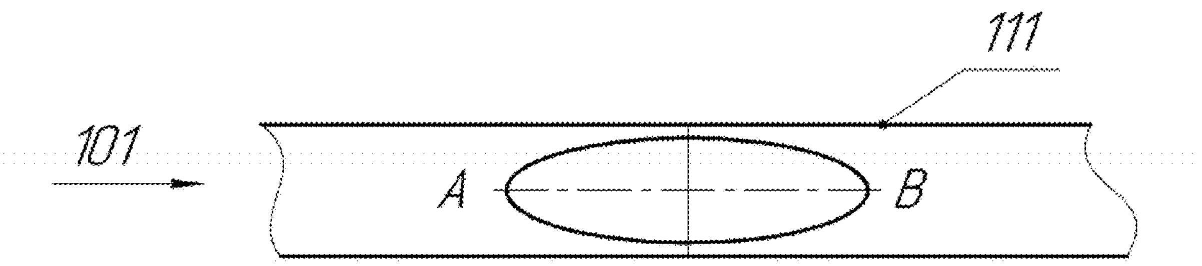
Figure 5B:
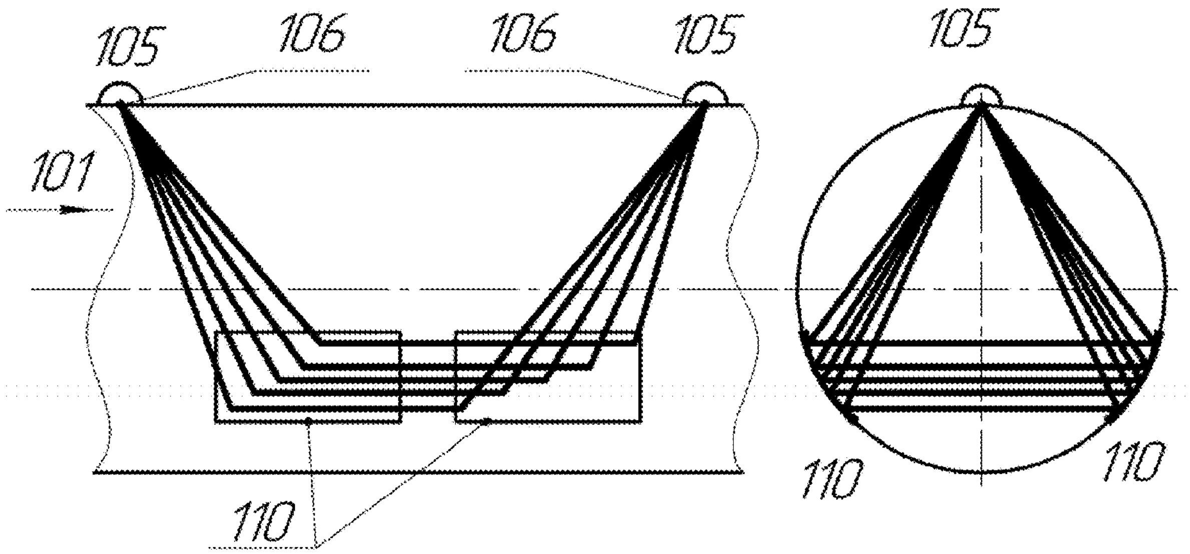
Figure 5C:
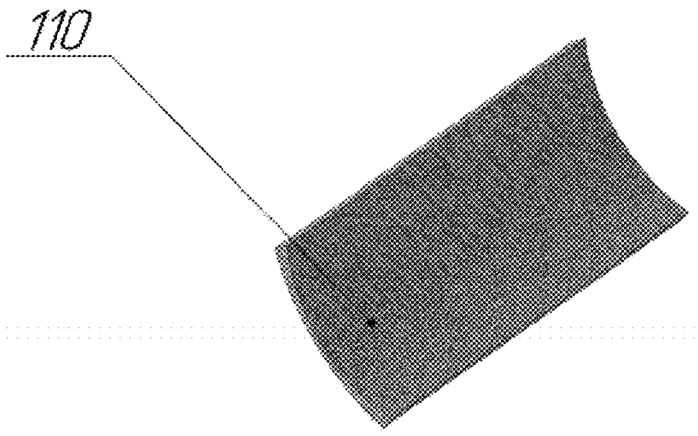

In FIGS. 5A-5C, embodiments of openings in tubes and reflecting surfaces are schematically provided.

EMBODIMENT OF THE INVENTION

In FIGS. 1A-1G, measuring device (100) for measuring the flow velocity of fluid flowing in the pipeline in the flow main direction (101) shown by the arrow is schematically provided. Measuring device contains the casing (102), connected to the pipeline, made in the form of any rotation body, preferably, the casing can be the elongated cylinder. The casing can be obtained by any method known in the prior art, for example, be welding, forging or stamping from the steel sheet.

In the casing the means for separating the fluid flow into the plurality of flows (103) is located, each of the plurality of flows being passed in the channel (104) allocated for it.

The plurality of the tubes (111) installed parallel to the flow main direction (101) and fixed inside the casing (102) can act as the means for separating the fluid flow into the plurality of flows, the variant of fixing of tubes with one another is also possible. Cross-sectional areas of each of the plurality of tubes can be identical-FIG. 1E. Cross-sections of tubes can have the different shapes, for example, the circle, the oval, the square, the hexagon, or their combinations. Embodiments in which cross-sectional areas of each of the plurality of tubes can be unequal—FIG. 1F—are possible.

Figure 1B:
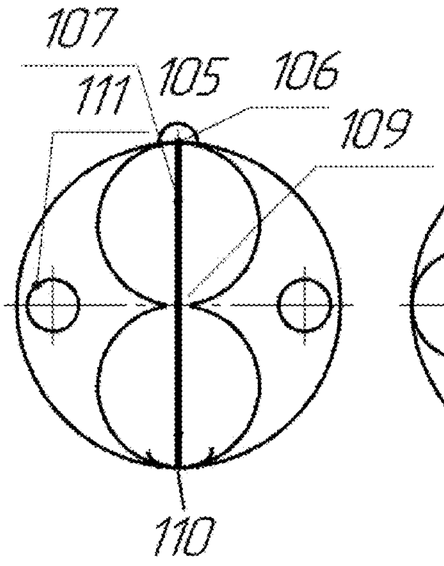
Figure 1C:
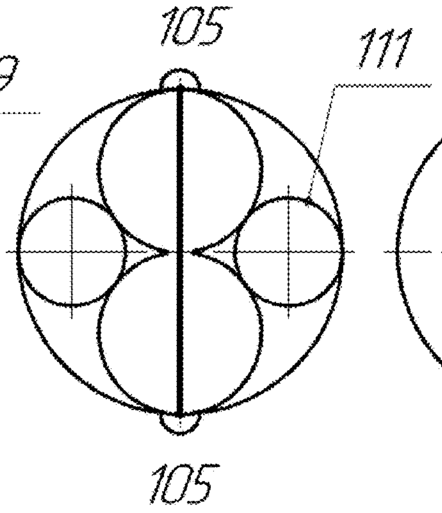
Figure 1D:
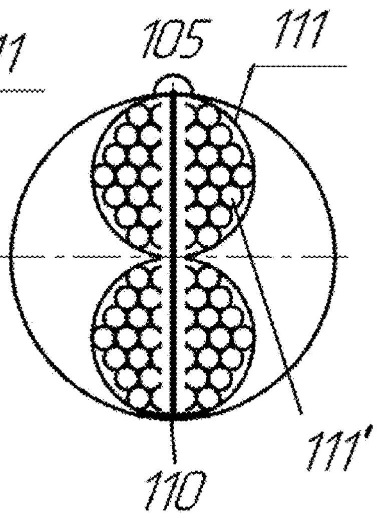

The variant in FIG. 1D in which the tube (111) is further separated into the plurality of smaller-sized channels is also possible, for example, in the tube (111) the plurality of other tubes (111') are fixed, in which case the through opening which passes through walls of the tube (111) and at least through the part of walls of tubes (111'), for ensuring passing of ultrasonic waves through of tubes (111) is provided. In this and other embodiments, ultrasonic waves need not pass through each of tubes (111').

As the flow via all channels goes with the same velocity, it is enough to measure flow velocity only in part of channels with the certain error and to confirm this error on the calibration bench.

Moreover, presence of channels in the measurement zone will allow to reduce influence of the external acoustic interference and also to provide repeated passing of the acoustic signal through the flow and to exclude influence of the side re-reflection of waves on measurement accuracy. At the same time, repeated passing of ultrasonic waves through the plurality of tubes will allow to increase measurement accuracy.

For the purpose of measuring the fluid flow velocity and flowrate, the device (100) contains at least one pair of ultrasonic transducers (105) spaced along the flow and intended for measuring the flow velocity of fluid passing through at least part of the plurality of channels (104) installed outside of the casing (102). At least one pair of ultrasonic transducers (105) is intended for forming and receiving the ultrasonic waves passing through the plurality of channels (104) and for generating the electric signals in response to receiving the ultrasonic waves that are directed for processing to the means (108) for calculating the fluid flow velocity and flowrate using the generated electric signals. The means (108) represents the processor unit implemented by hardware or software means, or their combinations.

Figures 1E, 1F, 1G:
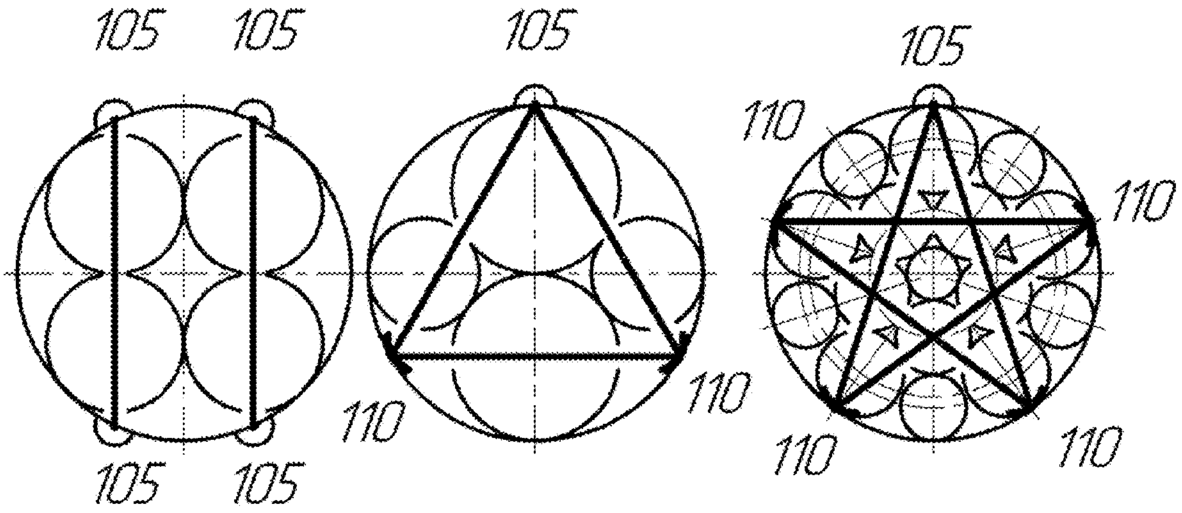

At least one pair of ultrasonic transducers (105) can be spaced along the flow and installed in one plane on one side of the casing (102)—FIGS. 1A, 1B, or installed in the opposite planes on both sides of the casing (102)—FIGS. 1C, 1E).

Each of pair of ultrasonic transducers (105) has the emitting surface (114) basically aligned with the inner surface of the casing (102) and parallel to the axis of the casing-FIG. 4C.

Using the transducer with the wide beam pattern of the acoustic emitter will allow to align the emitting surface of the ultrasonic transducer with the inner surface of the casing. Such alignment of surfaces will allow to reduce risk of pollution of the transducer in comparison with variant of installation of the transducer at an angle in which the indentation is formed. Such a construction has simpler installation technology of the transducer in the opening made at right angle.

Also the device (100) for measuring the fluid flow velocity and flowrate is provided with the means for directing the ultrasonic waves along the acoustic path (107) passing between at least one pair of ultrasonic transducers (105) and through the plurality of channels (104).

As the means for directing the ultrasonic waves along the acoustic path (107), at least pair of openings (106) in the casing (102) aligned with at least one pair of ultrasonic transducers (105) are used, the ultrasonic waves being passed through the openings (106) inside the casing (102) and being exited outside the casing (102). For directing the ultrasonic waves in the casing (102), through openings (109) through the tubes (111) are used.

Also, for directing the ultrasonic waves the plurality of the reflecting surfaces (110) installed on the inner surface of the casing-FIGS. 1A, IF, and/or plurality of the reflecting surfaces (112) installed on the outer surface of tubes-FIG. 4B, can be used. In FIG. 1F, the embodiment in which the acoustic path has two reflections in the casing is provided, in FIG. 1G there are four reflections in the casing, the profile of the acoustic path being "five-pointed star".

The reflecting surface (110), (112) can represent the plate intended for receiving and directing the ultrasonic waves along the acoustic path. Also the concave curved surface can be provided in the plate, or the plate can represent the concave curved surface, for receiving and focusing on the receiving transducer and for directing the ultrasonic waves along the acoustic path. The concave curved surface will allow to focus diverging ultrasonic waves from one transducer and to direct them to other transducer with increase in signal power, FIG. 5C.

The plate can be attached by means of one of welding, glue, the dismountable connection, or integrated with the tube and is formed during production of the tube.

In the embodiment in FIG. 2, other embodiment of the means for separating the fluid flow into the plurality of flows representing pair of plates (201) installed at the input to the casing (102) and at the output from the casing (102) perpendicular to the flow main direction (101) is provided, each of plates (201) being contained the plurality of openings (202), each of which exits in tube (203) fixed in the opening (202), as a result the plurality of tubes (203) pass inside the casing (102) between plates (201).

In FIGS. 3A-3B, another embodiment of the invention in which the casing (102) is solid and the means for separating the fluid flow into the plurality of flows represents the plurality of through openings (301) made parallel to the flow main direction (101) in the solid casing (102) is schematically provided. Also, in this variant openings (302) are provided in the solid casing (102) on the course of following the acoustic path (107). Such embodiment does not provide presence of reflecting surfaces.

In FIG. 3C, the embodiment in which the solid casing (102) together with through openings (301) is made by casting, ultrasonic transducers (105) are installed from outer side of the casing (102) is provided. In this variant, openings (302) are provided in the solid casing (102) on the course of following the acoustic path (107). The acoustic path (107) passes through the opening (302) from the ultrasonic transducer (105) through the opening (106) in the external part of the casing (102) to the through opening (301), then again through the inner part of the casing (102) towards other through opening (301), or towards the opening (106) in the external part of the casing (102) to other ultrasonic transducer (105). In this case, there is provided installation/forming of reflecting surfaces (113) on the inner wall of the channel.

In FIGS. 4A-4C, embodiments of means for directing the ultrasonic waves along the acoustic path (107) are schematically provided.

In FIG. 4A, the embodiment providing presence of openings (106) in the casing (102) and openings (109) in the tube (111) is provided, in which case the acoustic path passes only through the openings (106), (109).

In FIG. 4B, the embodiment providing presence of openings (106) in the casing (102) and openings (109) in the tube (111) and also presence of the reflecting surfaces (112) installed on the outer surface of tubes (111) is provided, in which case the acoustic path passes inside the casing through the openings (106), and is directed inside the casing along the acoustic path by means of openings (109) and reflecting surfaces (112) installed on the outer surface of tubes (111).

In FIG. 4C, the embodiment providing presence of openings (106) in the casing (102) and openings (109) in the tube (111) and also of presence of the reflecting surfaces (110) installed on the inner surface of the casing (102) is provided in which case the acoustic path passes through the openings (106), (109), and is directed inside the casing along the acoustic path by means of reflecting surfaces (110), wherein there are two reflections in the casing, and the arrangement providing the larger number of reflections is possible.

In FIG. 5A, the embodiment of the opening (109) in the tube (111) which is preferably made in the form of the ellipse is provided, wherein the major axis A-B of the ellipse is directed in the direction, parallel to the flow main direction (101). Such form of the opening is due to the fact that ultrasonic waves when passing through the fluid flow will be drifted by the flow, whereby measurement readings will be distorted. So in case of flow velocity of 40 m/s and length of the acoustic path of 0.5 m the ultrasonic wave will be drifted by 0.05 m. Making of the opening (109) in the form of the opening oblong along the flow is also possible.

Making of the opening in the form of the ellipse will allow to reduce influence of drifting the ultrasonic waves by the flow and to obtain more accurate measurements.

In FIG. 5B, the embodiment of locating the reflecting surfaces which are made in the form of concave plates is provided, wherein such making will further allow to improve focusing of ultrasonic waves on the receiving transducer.

Also reflecting surface can be made by means of forming the concave surface on the inner surface of the casing, for example, by milling or during production.

In FIG. 5C, the isometric type of the embodiment of the reflecting surface is presented in the plate form.

The method of measuring the flow velocity of fluid flowing in the flow main direction wherein the fluid is passed through the device for measuring the fluid flow velocity and flowrate and the measurement reading of the fluid flow velocity is given is also offered.

The invention claimed is:

1. A device for measuring flow velocity and flowrate of fluid passing in a flow main direction, the device comprising: a casing, means for separating the fluid into a plurality of flows, each of the plurality of flows being passed in a channel allocated for it and located in the casing; at least one pair of ultrasonic transducers installed in the casing and configured for forming and receiving ultrasonic waves crossing the channels and for generating electric signals in response to receiving the ultrasonic waves; means for directing the ultrasonic waves along an acoustic path crossing at least part of the channels; means for calculating the flow velocity and flowrate using the electric signals, wherein the means for directing the ultrasonic waves along the acoustic path is at least a pair of openings in the casing and a plurality of openings in the channels.

2. The device according to claim 1 wherein each of the channels is further separated into a plurality of channels.

3. The device according to claim 1 wherein cross-sectional areas of the channels are not equal.

4. The device according to claim 1 wherein cross-sectional areas of the channels are equal.

5. The device according to claim 1 wherein each of the at least one pair of ultrasonic transducers has an emitting surface aligned with an inner surface of the casing and parallel to a casing axis.

6. The device according to claim 1 wherein the means for separating the fluid flow into the plurality of flows is a plurality of pipes installed parallel to the flow main direction and fixed inside the casing.

7. The device according to claim 1 wherein the means for separating the fluid flow into the plurality of flows comprises at least a pair of plates, installed at an input to the casing and at an output from the casing each of said plates being perpendicular to the flow main direction and having openings, through which tubes connecting the plates and forming the channels extend.

8. The device according to claim 1 wherein the casing is solid and the means for separating the fluid flow into the plurality of flows is a plurality of through openings that are parallel to the flow main direction in the solid casing.

9. The device according to claim 1 wherein the means for directing the ultrasonic waves along the acoustic path further comprises a plurality of reflecting surfaces on an inner surface of the casing.

10. The device according to claim 9 wherein the plurality of reflecting surfaces comprise plates configured for receiving and directing the ultrasonic waves along the acoustic path.

11. The device according to claim 10 wherein the plates have concave curved surfaces for receiving, focusing and directing the ultrasonic waves along the acoustic path.

12. The device according to claim 11 wherein the plates are attached by welding, glue, or a dismountable connection.

13. The device according to claim 11 wherein the plates are integrated with the channels and formed during production of the channels.

14. The device according to claim 9 wherein the plurality of reflecting surfaces are concave surfaces integrated with the inner surface of the casing.

15. The device according to claim 9 wherein the plurality of openings in the channels are in the form of (i) ellipses, having major axes parallel to the flow main direction, or (ii) rectangles, being oblong parallel to the flow main direction, or (iii) combinations of (i) and (ii).

16. The device according to claim 1 wherein the means for directing the ultrasonic waves along the acoustic path further comprises one of more of; a plurality of reflecting surfaces on an inner surface of the casing; a plurality of reflecting surfaces on outer surfaces of the channels, and a plurality of reflecting surfaces on inner surfaces of the channel.

17. The device according to claim 16 wherein the plurality of openings in the channels are in the form of (i) ellipses, having major axes parallel to the flow main direction, or (ii) rectangles, being oblong parallel to the flow main direction, or (iii) combinations of (i) and (ii).

18. The device according to claim 16 wherein the plurality of reflecting surfaces comprise plates configured for receiving and directing the ultrasonic waves along the acoustic path.

19. The device according to claim 16 wherein the plurality of reflecting surfaces are concave surfaces integrated with the inner surface of the casing.

20. The device according to claim 1 wherein the plurality of openings in the channels are in the form of (i) ellipses, having major axes parallel to the flow main direction, or (ii) rectangles, being oblong parallel to the flow main direction, or (iii) combinations of (i) and (ii).

21. A method of measuring the flow velocity and flowrate of the fluid flowing in the flow main direction, the method comprising passing the fluid through the device according to claim 1 and outputting, from the device, a measurement reading of the fluid flow velocity and the fluid flowrate.

* * * * *